United States Patent [19]
Serizawa et al.

[11] Patent Number: 5,274,670
[45] Date of Patent: Dec. 28, 1993

[54] METHOD OF EQUALIZATION IN DIGITAL MOBILE COMMUNICATION WITH IMPROVED TRACKING ABILITY

[75] Inventors: Mutsumu Serizawa; Minoru Namekata, both of Tokyo, Japan

[73] Assignee: Kabushiki Kaisha Toshiba, Kawasaki, Japan

[21] Appl. No.: 843,714

[22] Filed: Feb. 28, 1992

[30] Foreign Application Priority Data

Mar. 1, 1991 [JP] Japan .................................. 3-036390

[51] Int. Cl.$^5$ .............................................. H03H 7/30
[52] U.S. Cl. .......................................... 375/13; 375/14
[58] Field of Search ...................... 375/13, 14; 333/18, 333/28 R; 364/724.19, 724.20

[56] References Cited

U.S. PATENT DOCUMENTS 4,829,543  5/1989  Borth et al. ..................... 375/14 X

OTHER PUBLICATIONS

Proc. National Convention of IEIEC of Japan, Spring B-316, pp. 2-316, A. Higashi, et al., "Ber Performances of Direction Selecting Equalizer for High Speed Digital Mobile Radio".

Transactions or the IEICE of Japan, vol. J74-B, No. 3, pp. 91-100, Akihiro Higashi, et al., "Dual-Mode Equalization for Digital Mobile Radio".

IBM J. Res. Develop, May 1974, pp. 267-273, D. Godard, "Channel Equalization Using a Kalman Filter for Fast Data Transmission".

Proceeding of the IEEE, vol. 73, No. 9, pp. 1349-1387, Sep. 1985, S. U. H. Qureshi, "Adaptive Equalization".

*Primary Examiner*—Curtis Kuntz
*Assistant Examiner*—Tesfaldet Bocure
*Attorney, Agent, or Firm*—Oblon, Spivak, McClelland, Maier & Neustadt

[57] ABSTRACT

A method of equalization in a digital mobile communication capable of realizing an improved tracking of the variations of the transmission path characteristics, such that it becomes possible to achieve the good error rate characteristic. In the method, the forward and backward equalizations are carried out, while the forward and backward evaluation functions indicating reliabilites of the forward and backward equalizations are calculated by using the signal sequence, and a final equalization output is obtained by selecting for each bit of the signal sequence one of the forward and backward equalization outputs for which the reliability indicated by corresponding one of the forward and backward evaluation functions is higher as final equalization output for each bit. The detection of an abnormal state such as a sudden drop of a signal strength of the signal sequence or a limit cycle state of an equalizer may be used instead of the evaluation functions.

16 Claims, 17 Drawing Sheets

× : FORWARD EQUALIZATION ONLY
△ : BACKWARD EQUALIZATION ONLY
○ : BI-DIRECTIONAL EQUALIZATION

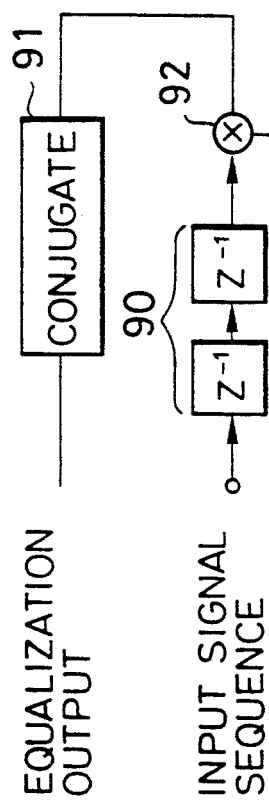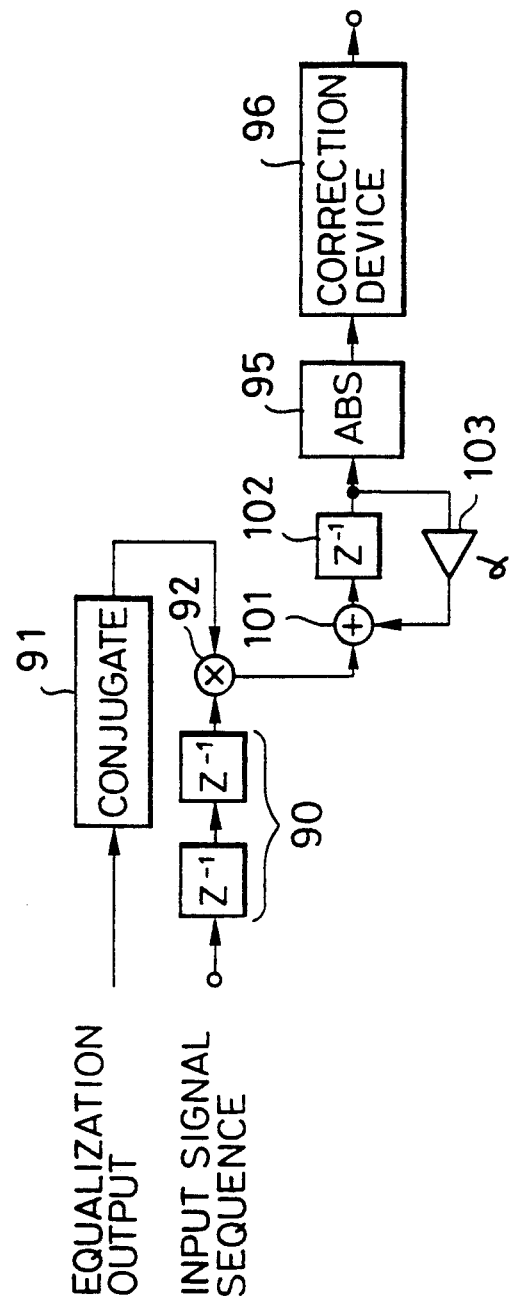
FIG.15
FIG.16

METHOD OF EQUALIZATION IN DIGITAL MOBILE COMMUNICATION WITH IMPROVED TRACKING ABILITY

BACKGROUND OF THE INVENTION

1. Field of the Invention

The present invention relates to a method of equalization in a digital mobile communication such as an automobile telephone.

2. Description of the Background Art

In recent years, numerous researches have been carried out for the practical realization of digital mobile communication systems. In particular, for a digital automobile telephone system, a so called TDMA (Time Division Multiple Access) system is most likely to be adopted in Japan, U.S.A., and Europe.

Conventionally, such a TDMA system has been unable to achieve a good communication quality in a straight-forward manner because of a large influence of multi-path due to the high speed transmission speed, so that a use of equalizers has been indispensable.

However, in a conventional equalizer, a tracking of the variations of the transmission path characteristics by the equalizer becomes difficult when the Rf frequency to be utilized is high or a moving speed of the mobile station is high, such that it becomes difficult to achieve a good error rate characteristic.

Thus, there has been a problem that it has been difficult to achieve the sufficient tracking ability of the equalizer by using a conventional equalizer. This conventional problem persists even when the equalizer to be used is a decision feedback equalizer using an RLS (Recursive Least Square) algorithm which is known to have the best tracking ability among the currently available equalizers.

Furthermore, the conventional equalizer has problems that the convergence of the tap coefficients in the training is insufficient and that the error becomes large under a so called non-minimum phase condition because of a finite tap length.

In order to cope with these problems of a conventional equalizer, there has been a proposition of a bi-directional equalization scheme by A. Higashi and H. Suzuki of the NTT Radio Communication Systems Laboratories in Yokosuka, Japan. This bi-directional equalization scheme is applicable for a case in which training sequences for carrying out the initial training of the equalizer tap coefficients are attached in front and back of the data to be demodulated and equalized.

Namely, in this bi-directional equalization scheme, the equalization is carried out in the following steps. First, by using the training sequence attached in front of the data to be demodulated and equalized, the initial training of the equalizer tap coefficients is carried out, and then a forward equalization in which the received signals are inputted, demodulated and equalized in the equalizer in the same order (forward direction) as they were received is carried out as shown in FIG. 1A. Secondly, the received signals are temporarily stored in a memory, and by using the training sequence attached behind the data to be demodulated and equalized the initial training of the equalizer tap coefficients is carried out, and then a backward equalization in which the temporarily stored received signals are read out from the memory and inputted, demodulated and equalized in the equalizer in the opposite order (backward direction) as they were received is carried out as shown in FIG. 1B. Finally, the equalization output obtained by either one of the forward equalization and the backward equalization for which the equalization error according to the equalization error signals obtained in the equalizer during the forward and backward equalizations is smaller is selected as the final output.

However, as these authors noted themselves, in this bi-directional equalizations scheme, the sufficient error rate is not necessarily obtainable as there are cases in which the error rate becomes large even when the equalization error is small. Such a situation can be described as follows.

Namely, a typical decision feedback equalizer conventionally used has a configuration shown in FIG. 2, where the decision feedback equalizer comprises a feedback tap 116 with a feedback coefficient C5, a plurality of feed-forward taps 117 (117-1, 117-2, 117-3) with feed-forward coefficients C1 to C4, an adder 118, a subtractor 119 and a decision device 111. The feed-forward taps 117 provide a forward part of the equalizer while the feedback tap 116 provides a feedback part of the equalizer, which are added together by the adder 118 to reconstruct the transmitted signal without the multi-path distortion. The decision device 111 determines the binary values of the transmitted signal, i.e., which portion is 0 and which portion is 1 in the transmitted signal, according to the output of the adder 118. The output of the decision device 111 is fed back to the feedback tap 116. Meanwhile, the subtractor 119 subtracts the output of the adder 118 from the output of the decision device 111 to obtain the equalization error signal $e(t)$, so as to assess the appropriateness of tap coefficients given to the feed-forward taps 117 and the feedback tap 116. The tap coefficient of each of the feed-forward taps 117 and the feedback tap 116 are adjusted according to this equalization error signal $e(t)$. Further detail description of the decision feedback equalizer can be found in "Adaptive Equalization", S. U. H. Qureshi, Proceeding of the IEEE, Vol. 73, No. 9, pp. 1349-1987, September, 1985.

Now, in such a decision feedback equalizer, as the convergence characteristic of the equalizer deteriorates, the equalizer frequently tends to operate in a so called limit cycle state in which all the feed-forward tap coefficients C1 to C4 take the value equal to zero. In this limit cycle state, the equalizer appears as if it has a configuration shown in FIG. 3, where all the feed-forward taps 117 are disconnected such that the equalization error signal also takes a value equal to zero, which is totally unrelated to the input signals so that the reliability of the equalizer operation is totally lost.

Thus, in the above described bi-directional equalization scheme, the sufficient error rate is not necessarily obtainable because the selection of the final output may have to be made on a basis of such a totally unreliable equalization error signal $e(t)$.

This problem related to the error rate in the bi-directional equalization scheme can also be seen from the experimental result reported by these authors, which is shown in FIG. 4. As can be seen in FIG. 4, the bi-directional equalization scheme is unable to achieve any significantly lower bit error rate compared with the cases using only either one of the forward equalization and backward equalization.

SUMMARY OF THE INVENTION

It is therefore an object of the present invention to provide a method of equalization in a digital mobile communication capable of realizing an improved tracking of the variations of the transmission path characteristics, such that it becomes possible to achieve a good error rate characteristic.

According to one aspect of the present invention there is provided a method of equalization, comprising the steps of: obtaining a signal sequence from received signals by applying frequency transformation and sampling; carrying out a forward equalization of the signal sequence to obtain a forward equalization output in which the signal sequence is equalized in an order in which the received signals are received; calculating a forward evaluation function indicating a reliability of the forward equalization by using the signal sequence; carrying out a backward equalization of the signal sequence to obtain a backward equalization output in which the signal sequence is equalized in an order opposite to that in which the received signals are received; calculating a backward evaluation function indicating a reliability of the backward equalization by using the signal sequence; and obtaining a final equalization output by selecting for each bit of the signal sequence one of the forward equalization output and the backward equalization output for which the reliability indicated by corresponding one of the forward evaluation function and the backward evaluation function is higher as final equalization output for each bit, such that the final equalization output is given as a composition of those parts of the forward equalization output for which the reliability indicated by the forward evaluation function is higher than the reliability of the backward equalization output indicated by the backward evaluation function and those parts of the backward equalization output for which the reliability indicated by the backward evaluation function is higher than the reliability of the forward equalization output indicated by the forward evaluation function.

According to another aspect of the present invention there is provided a method of equalization, comprising the steps of: obtaining a signal sequence from received signals by applying frequency transformation and sampling; carrying out a forward equalization of the signal sequence to obtain a forward equalization output in which the signal sequence is equalized in an order in which the received signals are received; carrying out a backward equalization of the signal sequence to obtain a backward equalization output in which the signal sequence is equalized in an order opposite to that in which the received signals are received; detecting an abnormal state in one of the forward equalization and the backward equalization; and obtaining a final equalization output by making a selection of one of the forward equalization output and the backward equalization output as the final equalization output until the abnormal state of said one of the forward equalization and the backward equalization is detected, and switching the selection for the final equalization output to another one of the forward equalization output and the backward equalization output after the abnormal state of said one of the forward equalization and the backward equalization is detected.

According to another aspect of the present invention there is provided a method of equalization, comprising the steps of: obtaining a signal sequence from received signals by applying frequency transformation and sampling, where the signal sequence comprises data to be equalized, and first and second training sequences which sandwiches the data to be equalized; carrying out a forward equalization of the signal sequence to obtain a forward equalization output in which the signal sequence is equalized in an order in which the received signals are received, from a top of the first training sequence to an end of the second training sequence; detecting a presence of errors in the forward equalization output for the second training sequence; in a case the presence of the errors in the forward equalization output for the second training sequence is not detected, obtaining a final equalization output as the forward equalization output for the data to be equalized; and in a case the presence of the errors in the forward equalization output for the second training sequence is detected, calculating a forward evaluation function indicating a reliability of the forward equalization by using the signal sequence; carrying out a backward equalization of the signal sequence to obtain a backward equalization output in which the signal sequence is equalized in an order opposite to that in which the received signals are received, from an end of the second training sequence to a top of the data to be equalized; calculating a backward evaluation function indicating a reliability of the backward equalization by using the signal sequence; and obtaining a final equalization output by selecting for each bit of the data to be equalized of the signal sequence one of the forward equalization output for the data to be equalized and the backward equalization output for the data to be equalized for which the reliability indicated by corresponding one of the forward evaluation function and the backward evaluation function is higher as final equalization output for each bit, such that the final equalization output is given as a composition of those parts of the forward equalization output for the data to be equalized for which the reliability indicated by the forward evaluation function is higher than the reliability of the backward equalization output for the data to be equalized indicated by the backward evaluation function and those parts of the backward equalization output for the data to be equalized for which the reliability indicated by the backward evaluation function is higher than the reliability of the forward equalization output for the data to be equalized indicated by the forward evaluation function.

Other features and advantages of the present invention will become apparent from the following description taken in conjunction with the accompanying drawings.

BRIEF DESCRIPTION OF THE DRAWINGS

FIG. 15 is a simplified configuration of evaluation function calculation unit of FIG. 11 incorporating the low pass filter of FIG. 13.

FIG. 16 is a simplified configuration of evaluation function calculation unit of FIG. 11 incorporating the low pass filter of FIG. 13 and a correction device.

DETAILED DESCRIPTION OF THE PREFERRED EMBODIMENTS

Figure 5:
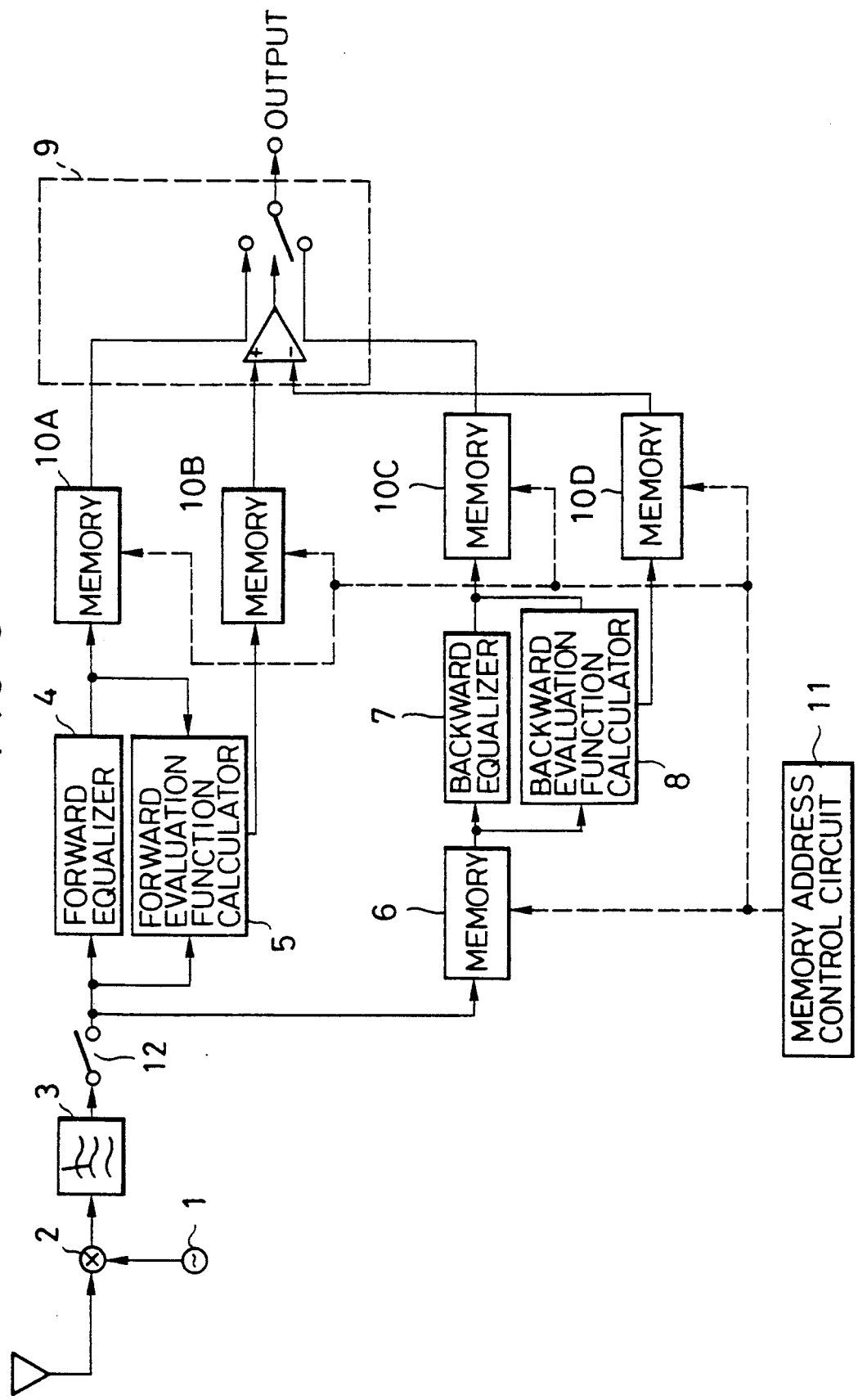
FIG. 5 is a block diagram of an equalization apparatus for carrying out one embodiment of a method of equalization according to the present invention.

Referring now to FIG. 5, an equalization apparatus for carrying out one embodiment of a method of equalization according to the present invention will be described.

In this embodiment, the equalization apparatus comprises an oscillator 1, a mixer 2, and a low pass filter 3 for carrying out a frequency conversion on received signals; a sampler 12 for sampling the frequency converted received signals to obtain signal sequences; a forward equalizer 4 for carrying out a forward equalization of the signal sequences; a forward evaluation function calculator 5 for calculating a forward evaluation function of the signal sequences equalized forwards by the forward equalizer 4; a memory 6 for temporarily storing the signal sequences; a backward equalizer 7 for carrying out a backward equalization of the signal sequences; a backward evaluation function calculator 8 for calculating a backward evaluation function of the signal sequences equalized backwards by the backward equalizer 7; a memory 10A for temporarily storing the forward equalization output obtained by the forward equalizer 4; a memory 10B for temporarily storing the forward evaluation function calculated by the forward evaluation function calculator 5; a memory 10C for temporarily storing the backward equalization output obtained by the backward equalizer 7; a memory 10D for temporarily storing the backward evaluation function calculated by the backward evaluation function calculator 8; a memory address control circuit 11 for controlling read and write addresses of the memories 6, 10A, 10B, 10C, and 10D; and a comparison and selection unit 9 for comparing the forward and backward evaluation functions stored in the memories 10B and 10D bit by bit, and for selecting one of the forward and backward equalization outputs stored in the memories 10A and 10C at each bit according to the result of the comparison.

Here, the forward and backward evaluation functions are the quantities obtained on a basis of the signal sequence which express the reliability of the corresponding forward and backward equalization outputs bit by bit, a detail of which will be described below.

In this equalization apparatus of FIG. 5, the received signals are frequency converted by the oscillator 1, mixer 2, and low pass filter 3, and then sampled by the sampler 12 to become the signal sequences.

Then, the obtained signal sequences are input into the forward equalizer 4, the forward evaluation function calculator 5, and the memory 6. In the forward equalizer 5, the signal sequences are equalized forwards where the signal sequences are inputted, demodulated and equalized in the forward equalizer 4 in the same order (forward direction) as they were received, while the forward evaluation function for indicating the reliability of the forward equalization output is calculated by the forward evaluation function calculator 5. The forward equalization output and the forward evaluation function obtained by the forward equalizer 4 and the forward evaluation function calculator 5 are then temporarily stored in the memories 10A and 10B, respectively.

On the other hand, the signal sequences temporarily stored in the memory 6 are subsequently equalized backwards where the signal sequences are read out from the memory 6 and inputted, demodulated and equalized in the backward equalizer 7 in the opposite order (backward direction) as they were received, while the backward evaluation function for indicating the reliability of the backward equalization output is calculated by the backward evaluation function calculator 8. The backward equalization output and the backward evaluation function obtained by the backward equalizer 7 and the backward evaluation function calculator 8 are then temporarily stored in the memories 10C and 10D, respectively.

Finally, the forward and backward evaluation functions temporarily stored in the memories 10B and 10D are compared at the comparison and selection unit 9 bit by bit, and then for each bit of the signal sequence, either one of the forward equalization output stored in the memory 10A and the backward equalization output stored in the memory 10C for which the reliability indicated by the respective evaluation function is higher is selected as the final output for that bit of the signal sequence.

Here, it is noted that the memory address control circuit 11 controls the addresses of the memories 6, 10C, and 10D differently for a case of reading and a case of writing, so that the equalization outputs read out from the memories 10A and 10C to the comparison and selection unit 9 as well as the evaluation functions read out from the memories 10B and 10D to the comparison and selection unit 9 are arranged in the same order as the received signals with respect to the same received signals.

Figure 1A:
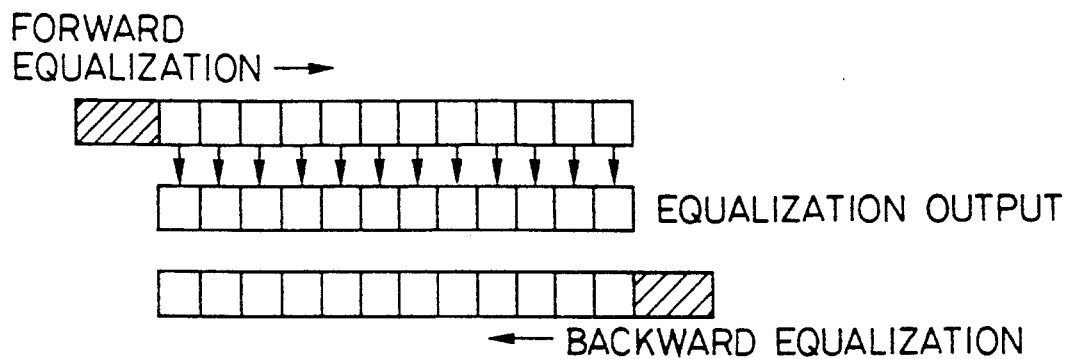
FIGS. 1A and 1B are diagrammatic illustrations of a procedure of a conventionally proposed bi-directional equalization scheme.
Figure 1B:
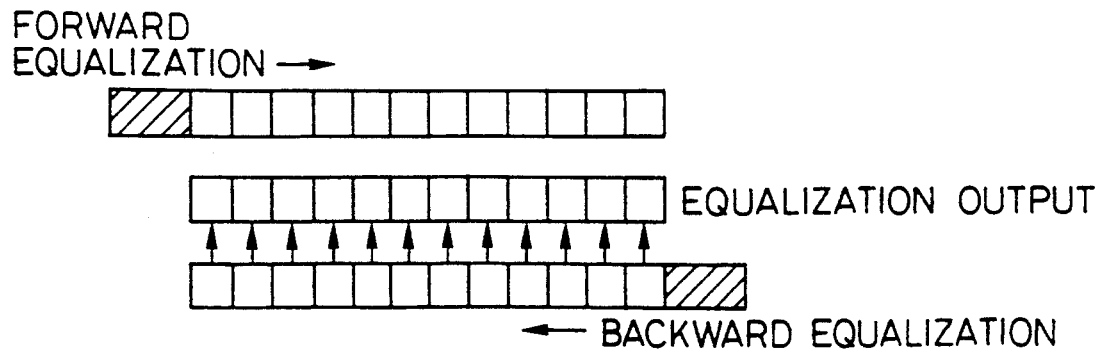
Figure 2:
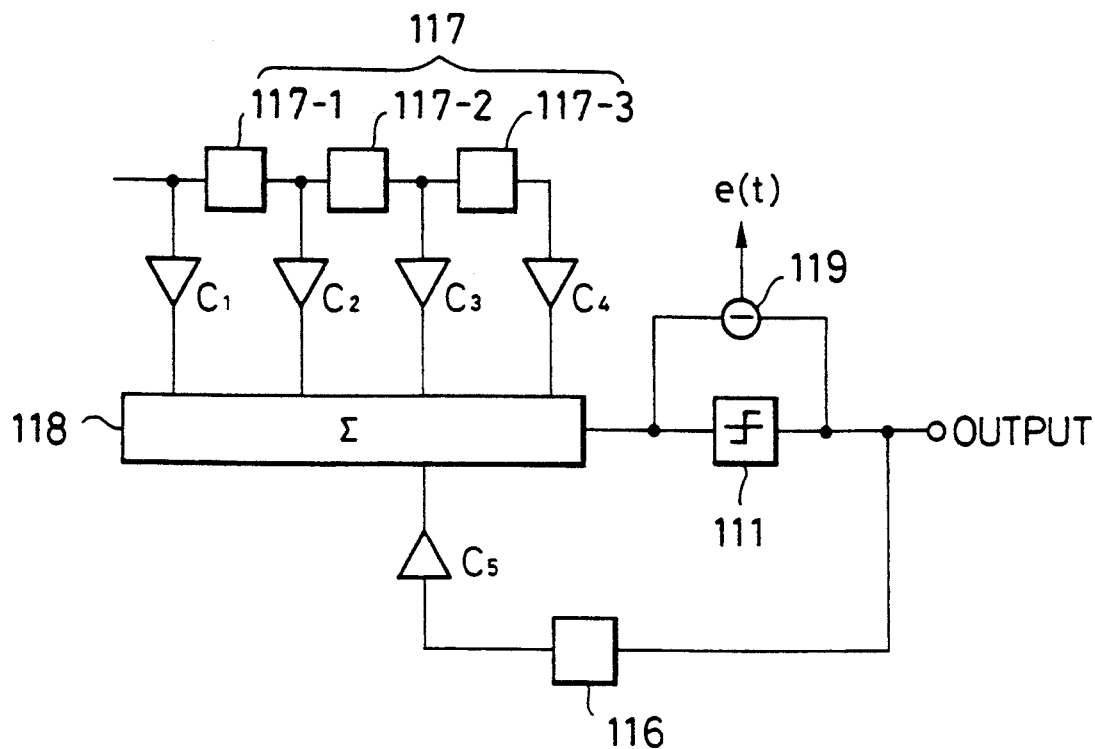
FIG. 2 is a schematic block diagram of a conventional decision feedback equalizer.
Figure 3:
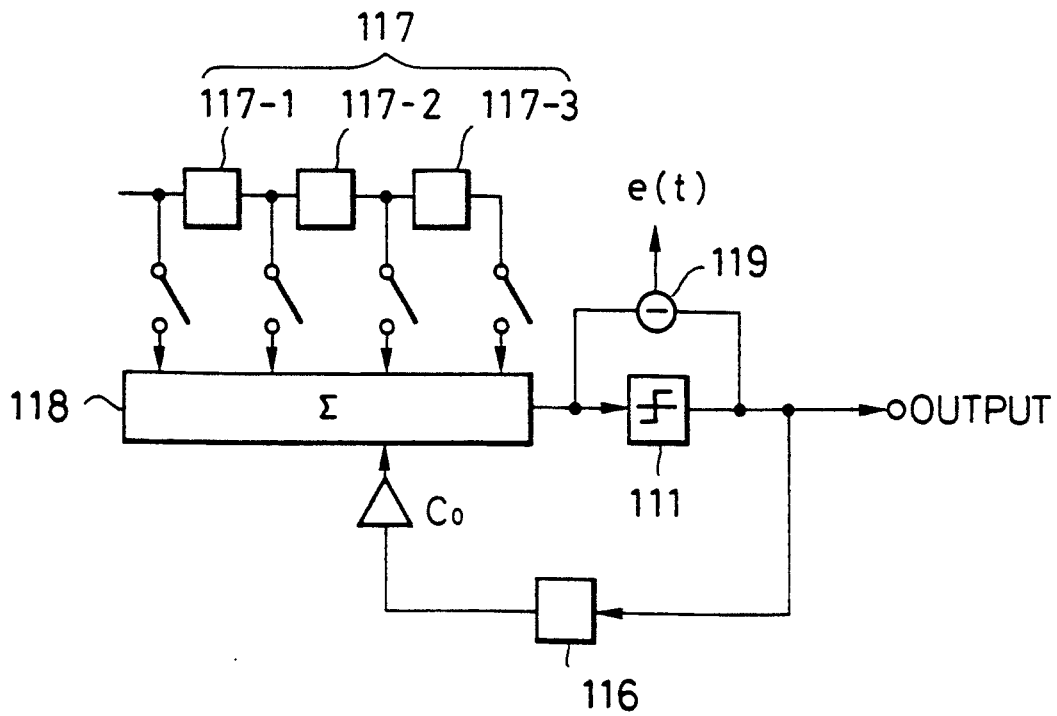
FIG. 3 is a schematic block diagram equivalent to a conventional decision feedback equalizer in a limit cycle state.
Figure 4:
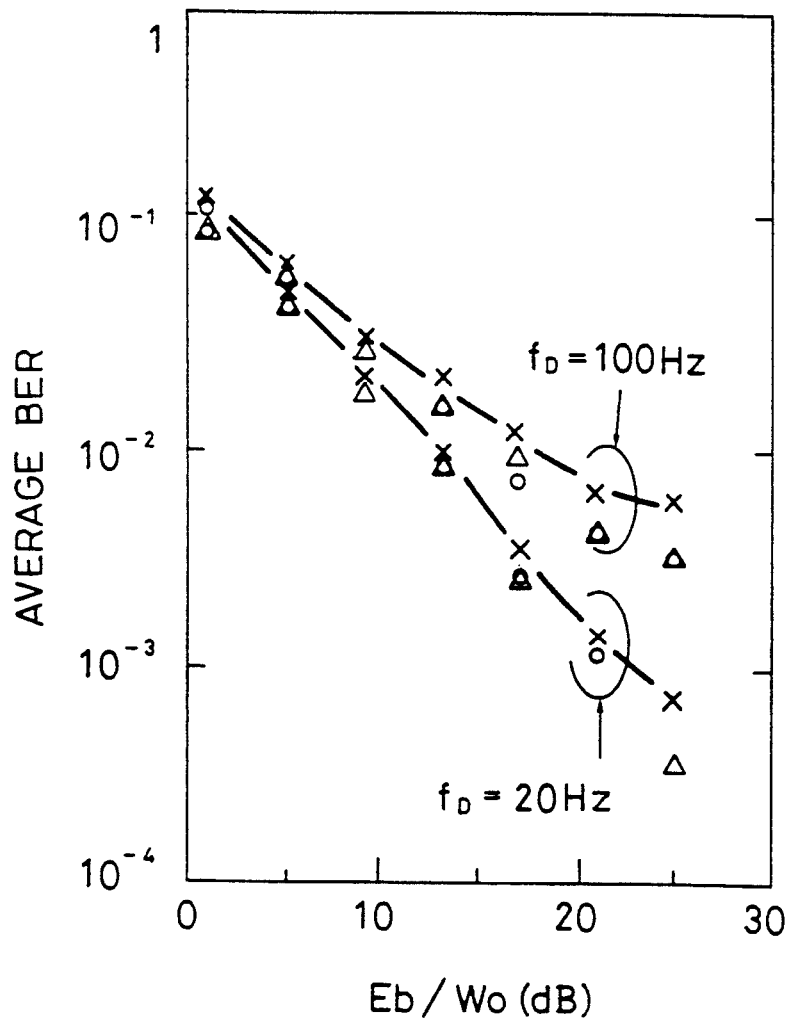
FIG. 4 is a graph of bit error rates obtained by experiments using three conventionally known equalization schemes.
Figure 6:
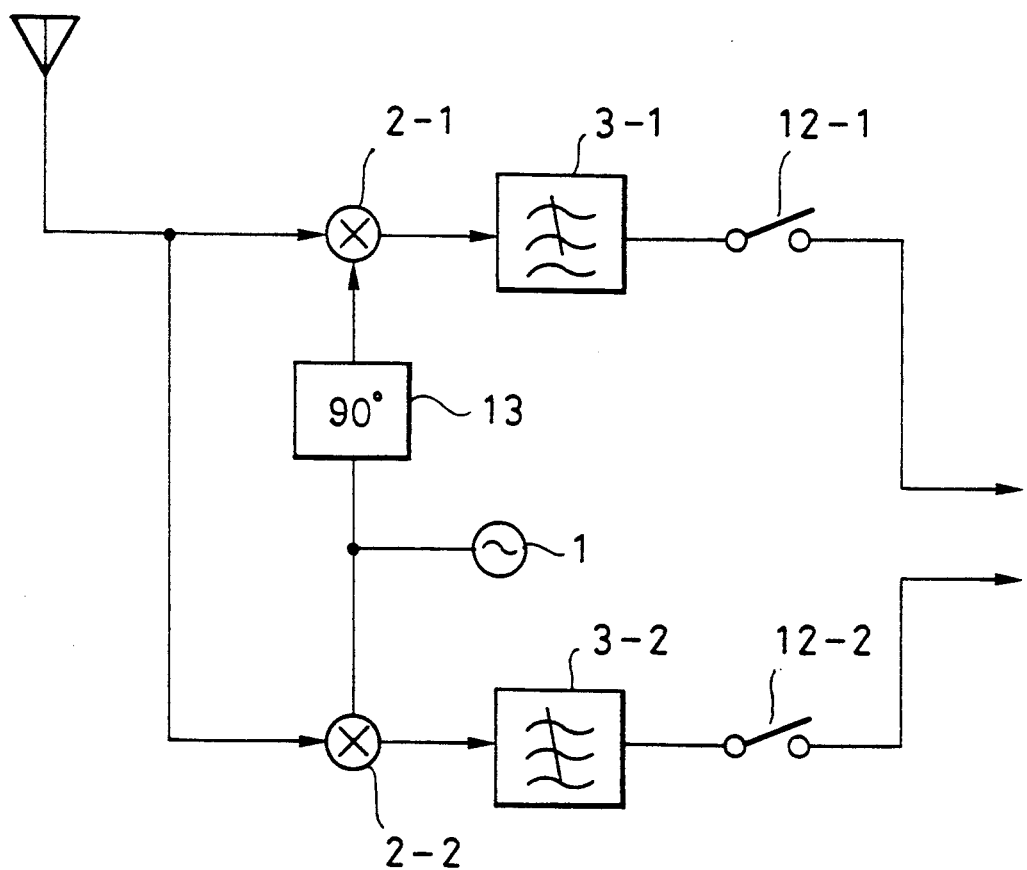
FIG. 6 is a block diagram of an alternative configuration for a part of the equalization apparatus of FIG. 5.

In the configuration of FIG. 1, the oscillator 1, mixer 2, low pass filter 3, and sampler 12 for obtaining the frequency converted signal sequences may be replaced by an orthogonal demodulator configuration and orthogonal semisynchronous wave detector configuration, such as that shown in FIG. 6 which comprises an oscillator 1, a pair of mixers 2-1 and 2-2, a pair of low pass filters 3-1 and 3-2, a pair of samplers 12-1 and 12-2, and a 90° phase change device 13 provided between the mixers 2-1 and 2-2.

Figure 7:
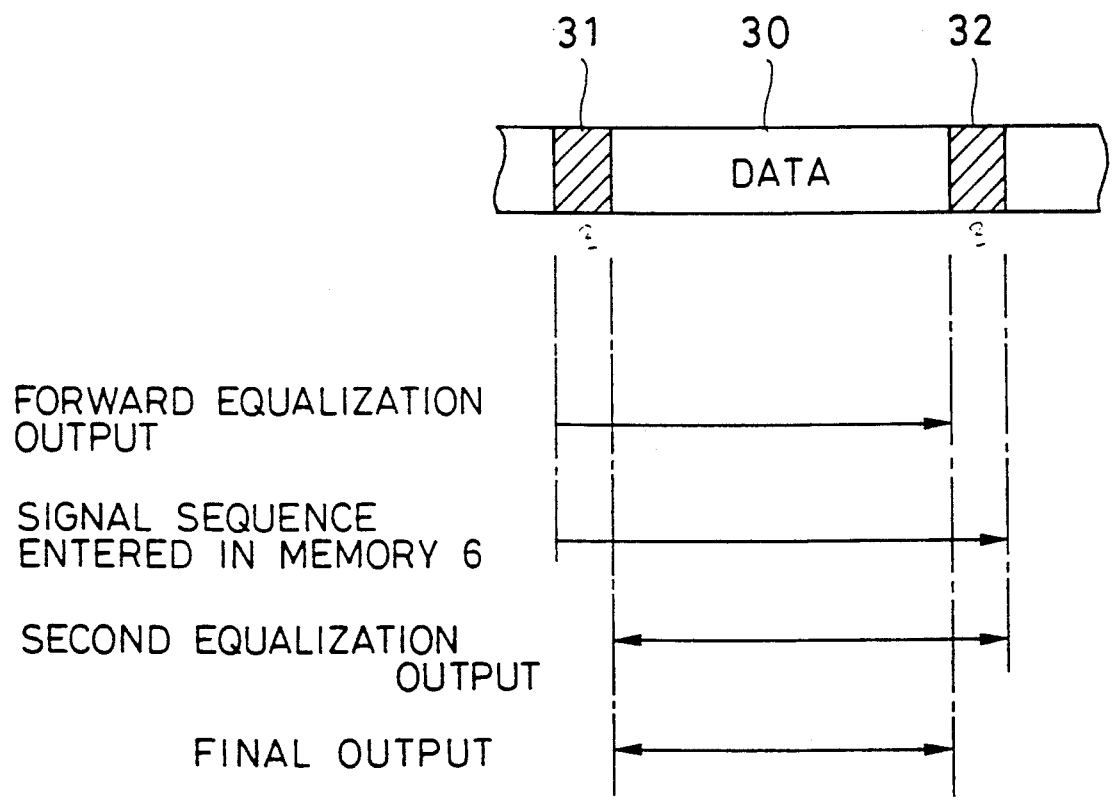
FIG. 7 is a diagrammatic illustration of a foam of a signal sequence to be equalized by the equalization apparatus of FIG. 5.

In this embodiment, the signals received, demodulated and equalized by the equalization apparatus of FIG. 5 are in format shown in FIG. 7. Namely, the data to be demodulated and equalized 30 is sandwiched by a first and a second training sequences 31 and 32 of predetermined known contents, where the first training sequence 31 occupies the 1-st to m-th symbols while the second training sequence 32 occupies the k+1-th to k+m-th symbols. Thus, the forward equalization output of the data 30 is obtained by equalizing the 1-st to k-th symbols in an order starting from the 1-th symbol and ending at the k-th symbol, while the backward equalization output of the data 30 is obtained by equalizing the k+m-th to m+1-th symbols in an order staring from the k+m-th symbol and ending at the m+1-th symbol. The corresponding forward and backward evaluation functions are also obtained from the symbols entered in the similarly orders.

Figure 8:
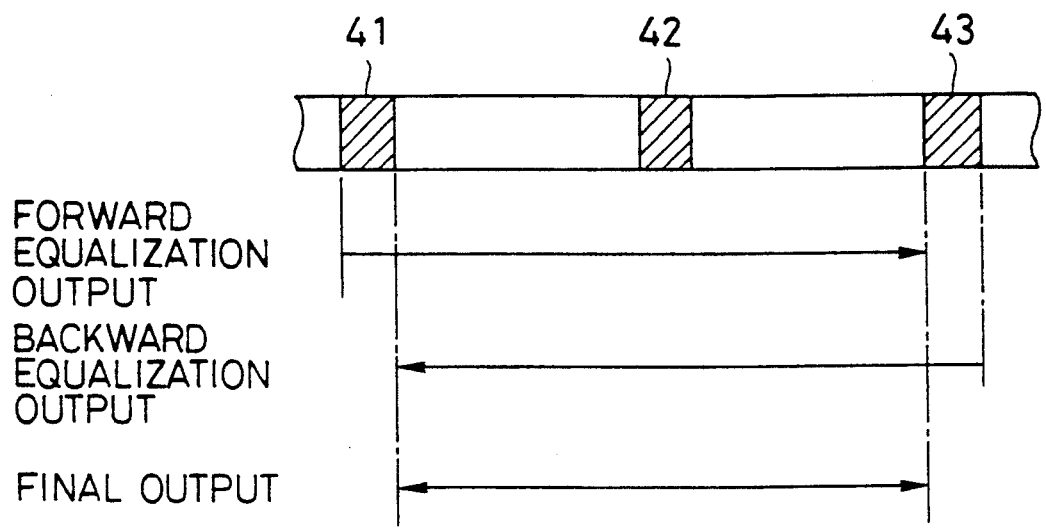
FIG. 8 is a diagrammatic illustration of another form of a signal sequence to be equalized by the equalization apparatus of FIG. 5.

Here, as shown in FIG. 8, the unit of the data to be equalized forwards and backwards by the equalization apparatus of FIG. 5 may be formed between two known training sequences 41 and 43 between which another known training sequence 42 is present. In particular, when the intermediate known training sequence 42 does not have a sufficient length to initiate the equalization operation, the use of a unit shown in FIG. 8 would be preferable. Also, in a case the distortion of the transmission path is expected to be not so large, there is no need to use the unit formed between the adjacent training sequences.

Figure 9:
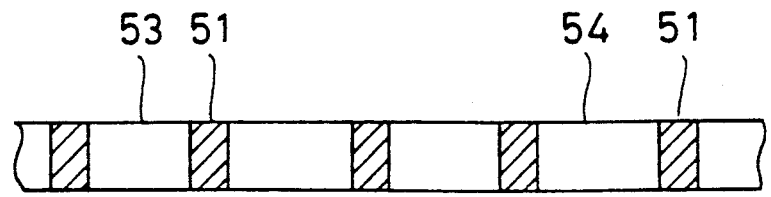
FIG. 9 is a diagrammatic illustration of still another form of a signal sequence to be equalized by the equalization apparatus of FIG. 5.

Furthermore, in the TDMA system, one channel of communication is usually divided into a plurality of slots along the time axis and are shared by a plurality of users by juxtaposing the data of one user next to the data of another user with a unique training sequence called a unique word assigned for each user preceding each data of each user, such that the data of a single user are usually placed intermittently in the signal sequence as shown in FIG. 9, where the data 53 and 54 of the same signale user is separated by the data of other users. In such a situation, the hardware configuration of the equalization apparatus of FIG. 1 can be made more compact by utilizing a single equalizer for both the forward and backward equalizers 4 and 7 and a single evaluation function calculator for both the forward and backward evaluation function calculators 5 and 8. Such a compact configuration can be formed as shown in FIG. 10.

Figure 10:
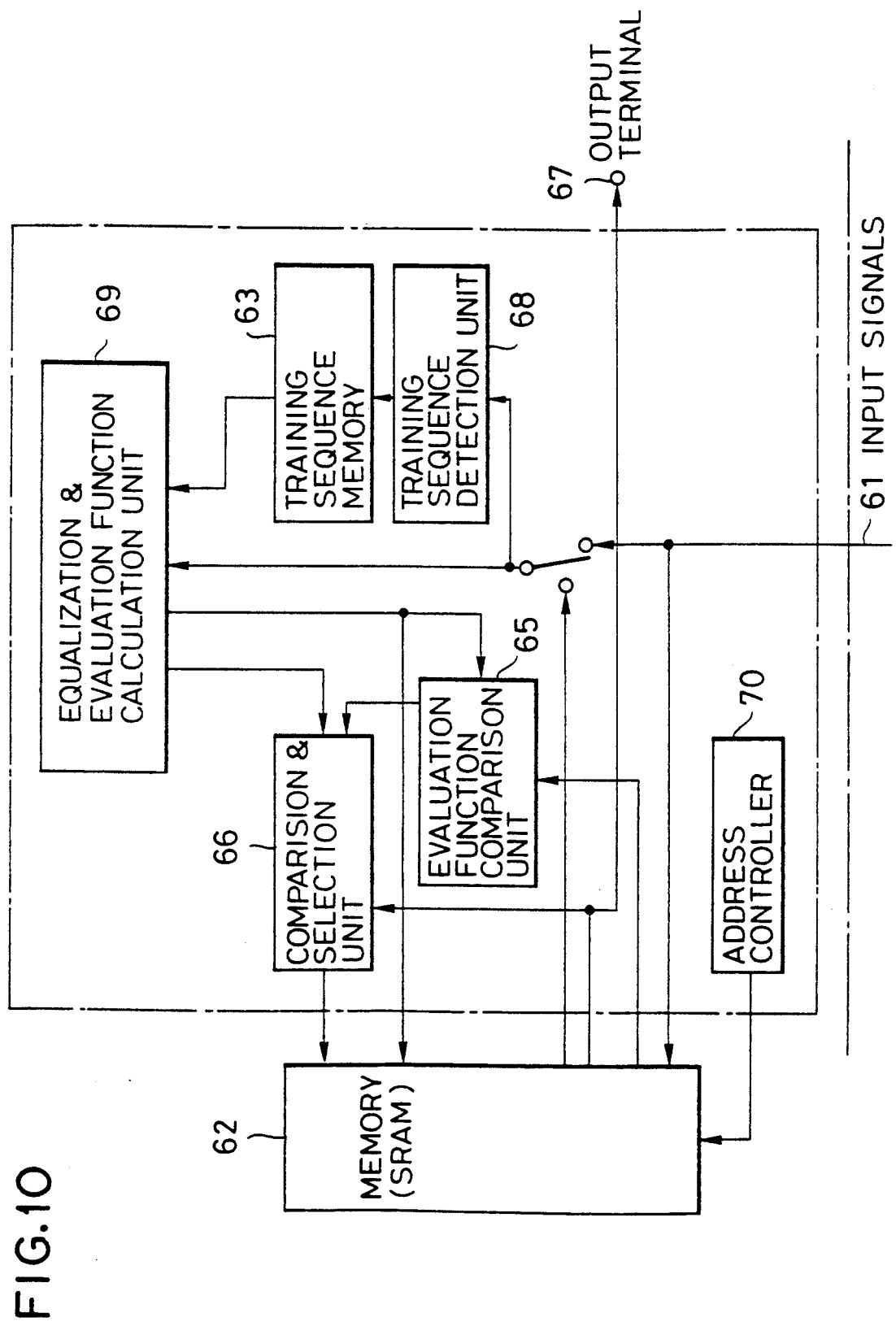
FIG. 10 is a block diagram of another configuration for an equalization apparatus for carrying out one embodiment of a method of equalization according to the present invention.

This configuration of FIG. 10 comprises an equalization and evaluation function calculation unit 69 for receiving and equalizing the input signals 61 both forwards and backwards while also calculating both the forward and backward evaluation functions; a memory 62 for storing the input signals as well as the equalization output and the evaluation function obtained by the equalization and evaluation function calculation unit 69; a training sequence memory 63 for memorizing a number of predetermined training sequences used in the input signals; an evaluation function comparison unit 65 for comparing the evaluation functions obtained by the equalization and evaluation function calculation unit 69 by the forward and backward equalizations; a comparison and selection unit 66 for comparing the evaluation functions obtained by the equalization and evaluation function calculation unit 69 by the forward and backward equalizations; a training sequence detection unit 68 for detecting the training sequences of the input signals 61; and an address controller 70 for controlling reading and writing addresses of the memory 62.

In this configuration of FIG. 10, the input signals 61 are first entered into the equalization and evaluation function calculation unit 69 so as to obtain the forward equalization output and the corresponding forward evaluation function which are subsequently stored in the memory 62, while the input signals 61 are also stored in the memory 62. Here, the initial training of the equalizer tap coefficients is carried out by one of the known training sequences stored in the training sequence memory 63.

Then, the input signals 61 stored in the memory 62 are read out from the memory 62 and inputted into the equalization and evaluation function calculation unit 69 in an order opposite to the original order in which the input signals 61 are originally received so as to obtain the backward equalization output and the corresponding backward evaluation function, where the obtained backward equalization output is outputted to the comparison and selection unit 66 while the obtained backward evaluation function is outputted to the evaluation function comparison means 65. Meanwhile, the forward evaluation function stored in the memory 62 is read out in an order opposite to that in which it is originally stored to the evaluation function comparison unit 65, such that the forward evaluation function and the backward evaluation function are compared bit by bit at the evaluation function comparison unit 65 and one of the forward and backward evaluation functions for which the indicated reliability is higher is selected bit by bit. Also, the forward equalization output stored in the memory 62 is read out in an order opposite to that in which it is originally stored to the comparison and selection unit 66.

Then, in accordance with the selection made at the evaluation function comparison unit 65, the corresponding one of the forward and backward equalization output is selected at the comparison and selection unit 66 bit by bit, and the selected one of the forward and backward equalization output is stored in the memory 62 bit by bit by overwriting the forward equalization output originally stored in the memory 62.

Finally, the selected equalization output is read out from the memory 62 in an order opposite to that in which it is written, so as to restore the corect order, and outputted to the output terminal 67.

Here, in a case that the input signals have a format as shown in FIG. 9 in which the relevant data 53 and 54 of the same user are placed intermittently and separated by the data for the other users, it becomes necessary to identify the training sequences inserted between data of each user and the data of the next user. Namely, in using a format shown in FIG. 9 in which the data of one user next to the data of another user with the unique training sequence for each user preceding the data of each user, each user does not know the training sequences of the other users who are sharing the same channel. Yet, it is necessary for the backward equalization of the data of each user to know the training sequence of the next user. For this reason, the training sequences used in the input signals are detected by the training sequence detection unit 68. In this regard, the detection of the training sequences can be achieved by providing N correlators in the training sequence detection unit 68 in correspondence to N training sequences known to be used in the input signals 61, and selecting the training sequence for which the maximum correlation output is obtained.

Figure 11:
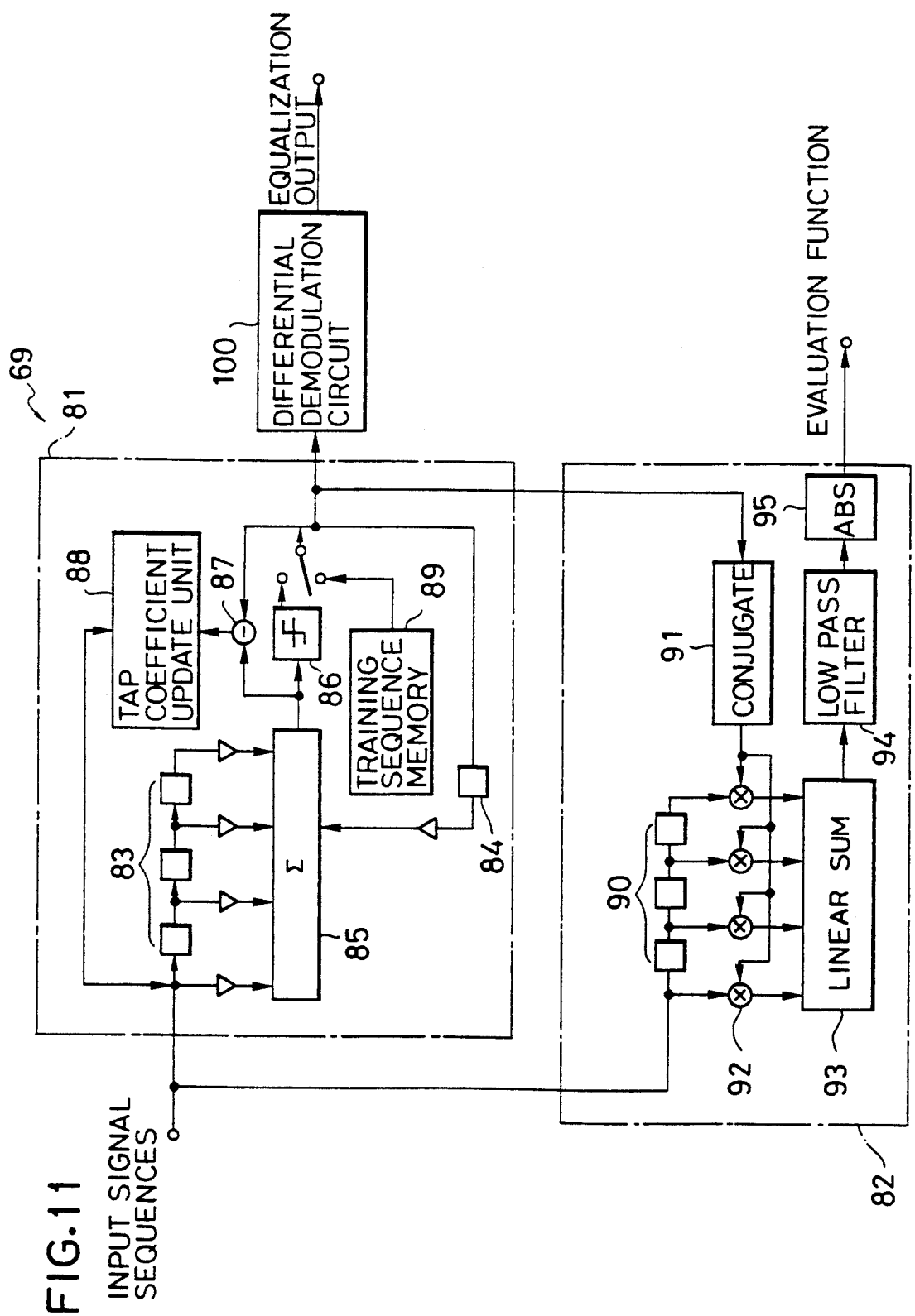
FIG. 11 is a detailed block diagram of an equalization and evaluation function calculation unit in the equalization apparatus of FIG. 10.

Referring now to FIG. 11, a detail of the equalization and evaluation function calculation unit 69 in the configuration of FIG. 10 will be described.

As shown in FIG. 11, the equalization and evaluation function calculation unit 69 generally comprises a decision feedback equalizer 81 and an evaluation function calculator 82.

The decision feedback equalizer 81 comprises: a plurality of feed-forward taps 83 for receiving the input signal sequences at respective delayed timings and multiplying them with respective feed-forward tap coefficients; a feedback tap 84 for providing a feedback of the previous equalization output by multiplying it with a feedback tap coefficient; an adder 84 for adding the input signal sequences multiplied by the feed-forward tap coefficients at the feed-forward taps 83 and the feedback of the previous equalization output multiplied by the feedback tap coefficient at the feedback taps together to obtain the equalized signals without the multi-path distortion; a decision device 86 for deciding the binary values of the equalized signals; a subtractor 87 for subtracting the equalized signals from the output of the decision device 86 in order to obtain the equalization error signal e(t); a tap coefficient update unit 88 for updating the feed-forward tap coefficients of the feed-forward taps 83 according to the equalization error signal obtained by the subtractor 87; and a training sequence memory 89 for providing the training sequence to the subtractor 87 and the feedback tap 84 in the initial training of the equalizer instead of the previous equalization output.

The feed-forward taps 83 provide a forward part of the equalizer while the feedback tap 84 provides a feedback part of the equalizer, which are added together by the adder 85 to reconstruct the equalized signal without the multi-path distortion. The decision device 86 determines the binary values of the equalized signal, i.e., which portion is 0 and which portion is 1 in the equalized signal, according to the output of the adder 85. The output of the decision device 86 is fed back to the feedback tap 84. Meanwhile, the subtractor 87 subtracts the output of the adder 85 from the output of the decision device 86 to obtain the equalization error signal e(t), so as to assess the appropriateness of tap coefficients given to the feed-forward taps 83 and the feedback tap 84. The tap coefficients of each of the feed-forward taps 83 and the feedback tap 84 are updated according to this equalization error signal e(t). The training signal from the training sequence memory 89 is used by the subtractor 87 and the feedback tap 84 in the initial training of the equalizer instead of the previous equalization output which is not yet available. The output obtained by the decision device 86 is outputted through a differential demodulation circuit 100 as the final equalization output in a case the received signals are differentially modulated originally.

The evaluation function calculator 82 comprises taps 90 for receiving the input signal sequences at respective delayed timings; a conjugate calculator 91 for calculating the complex conjugate of the equalization output obtained by the equalizer 81; multipliers 92 for multiplying the delayed input signal sequences received by the taps 90 with the complex conjugate calculated by the conjugate calculator 91; a linear sum calculator for calculating the linear sum of the delayed input signal sequences multiplied by the complex conjugate at the multipliers 92; a low pass filter for low pass filtering the linear sum calculated by the linear sum calculator 93; and an absolute value calculator for calculating the absolute value of the low pass filtered linear sum obtained by the low pass filter 94 in order to obtain the evaluation function. The evaluation function so obtained represents the correlation value of the signal sequence with respect to the equalization output used in the calculation, which expresses the reliability of the equalization carried out by the equalizer 91.

Figure 12:
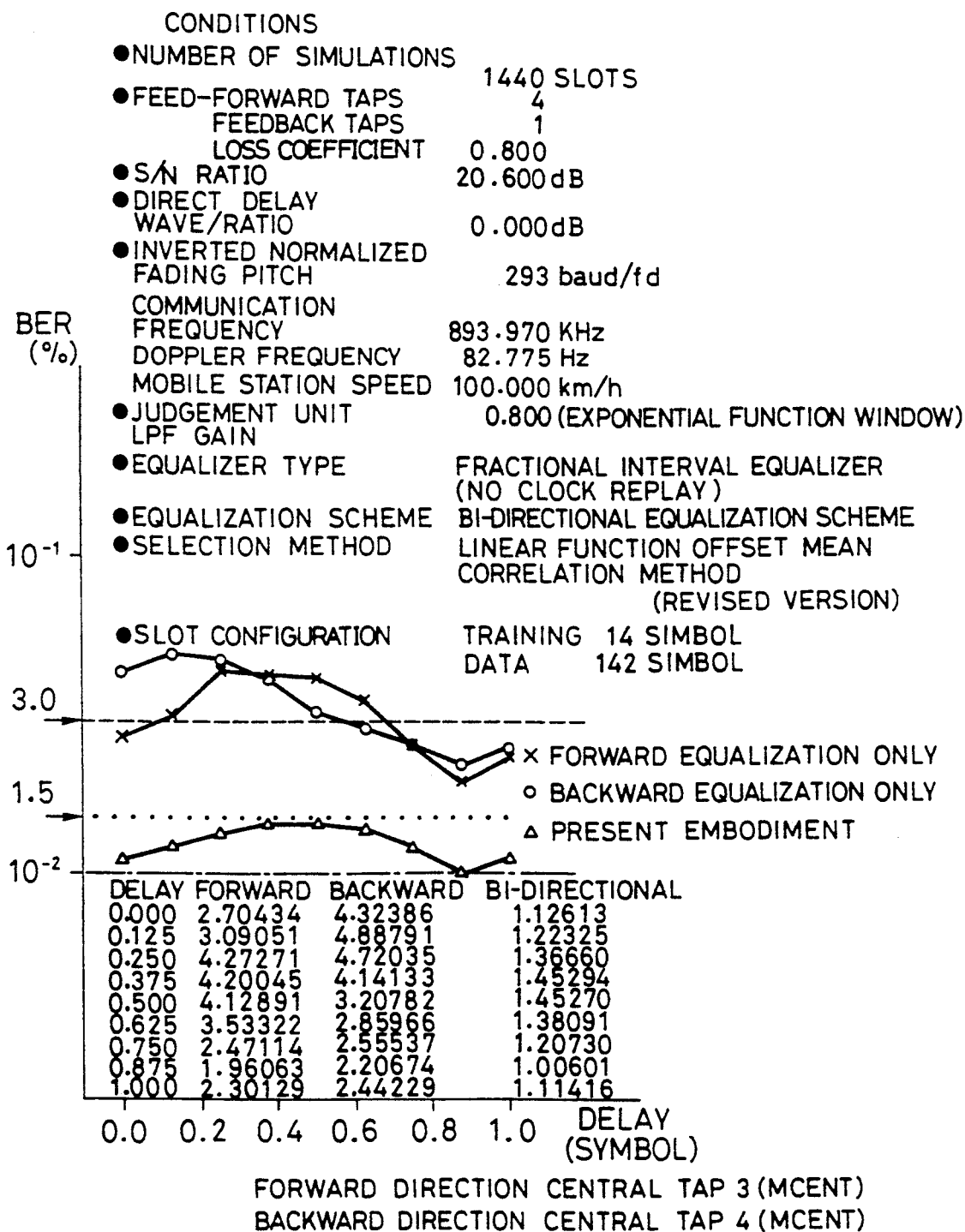
FIG. 12 is a graph of a bit error rate as a function of a delay interval for the method of equalization according to the present invention and for two conventional equalization methods.

The effect of the error rate improvement by the present embodiment explained above had been checked by a simulation experiment, the result of which is shown in the graph of FIG. 12. In this simulation experiment, the bit error rate as a function of a delay interval was checked for three cases of using the forward equalization only, using the backward equalization only, and using the present embodiment. As can be seen in FIG. 12, it was found that the bit error rate can be reduced by using the present embodiment to be less than one third of the other two cases. The conditions in which this simulation experiment was conducted as well as the raw data obtained by the simulation experiment are also shown in FIG. 12.

Figure 13:
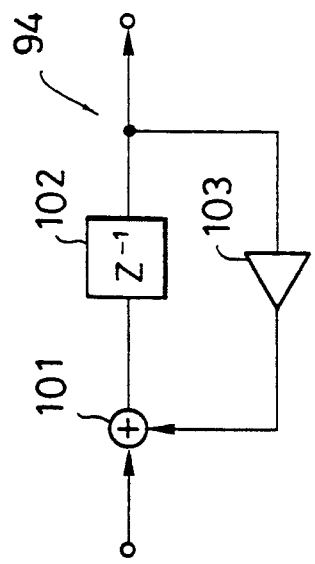
FIG. 13 is a block diagram of a configuration of a low pass filter in the evaluation function calculation unit of FIG. 11.

Referring now to FIG. 13, a configuration of the low pass filter 94 in the evaluation function calculator 82 of FIG. 11 will be described in detail.

Figure 14:
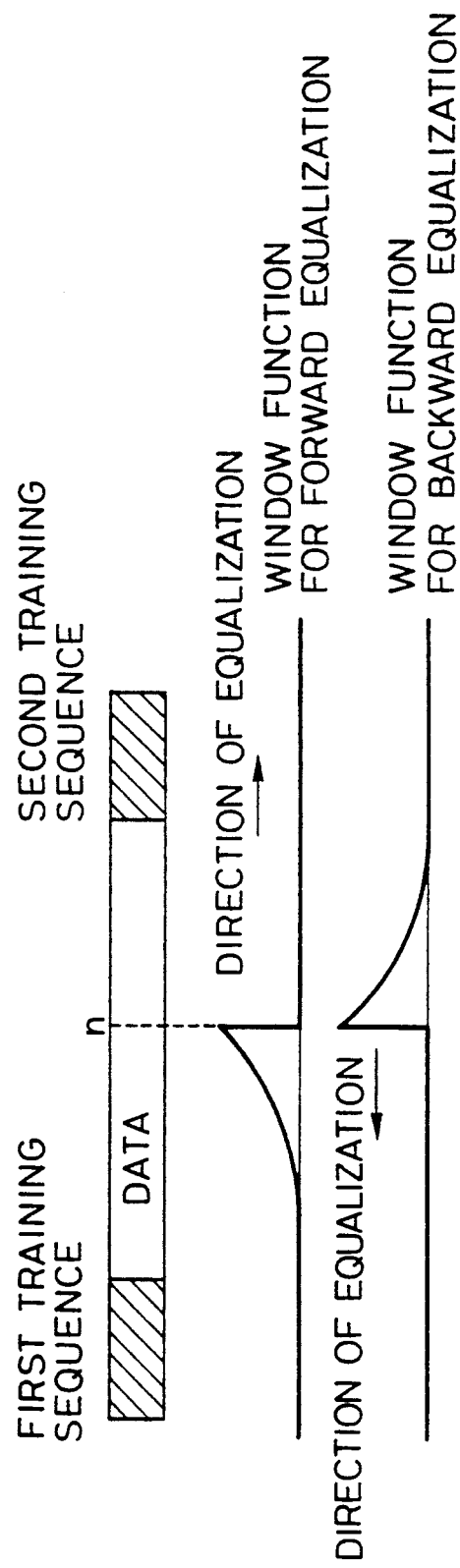
FIG. 14 is a diagrammatic illustration of forms of the signal sequence to be equalized and the window functions to be used in the low pass filter of FIG. 13.

In the configuration shown in FIG. 13, the low pass filter comprises an adder 101 which receives the input, a delay 102 for delaying the output of the adder 101, and a constant multiplier 103 for multiplying the delayed output of the adder with a predetermined constant and supplying it back to the adder 101 such that the adder 101 adds the input and the feed back from the constant multiplier 103. In effect, this low pass filter 94 functions to integrate the sequentially delayed input multiplied by the window function given by operation of the constant multiplier 103. In this case, the resulting output of this low pass filter 94 for the n-th bit of the data to be equalized appears as an exponential window function which decreases from the n-th bit toward the respective training sequence, as shown in FIG. 14.

Namely, the window function for the forward equalization is in a form of an exponential function with a shape peak at the n-th bit and a decreasing tail hanging toward the first training sequence to be used in the forward equalization, while the window function for the backward equalization is in a form of an exponential function with a shape peak at the n-th bit and a decreasing tail hanging toward the second training sequence to be used in the backward equalization.

In general, the reliability of the equalization output is higher for the bit closer to the training sequence used in the equalization. Therefore, the window function shown in FIG. 14 has a wider window toward the bits of the higher reliability, which is suitable for the proper judgement of the reliability of the equalization by using the evaluation function. It is noted that the window functions for the forward and backward equalizations should have the tails hanging in the opposite directions as shown in FIG. 14, because otherwise the fair comparison of the forward and backward evaluation functions becomes difficult.

Figure 17:
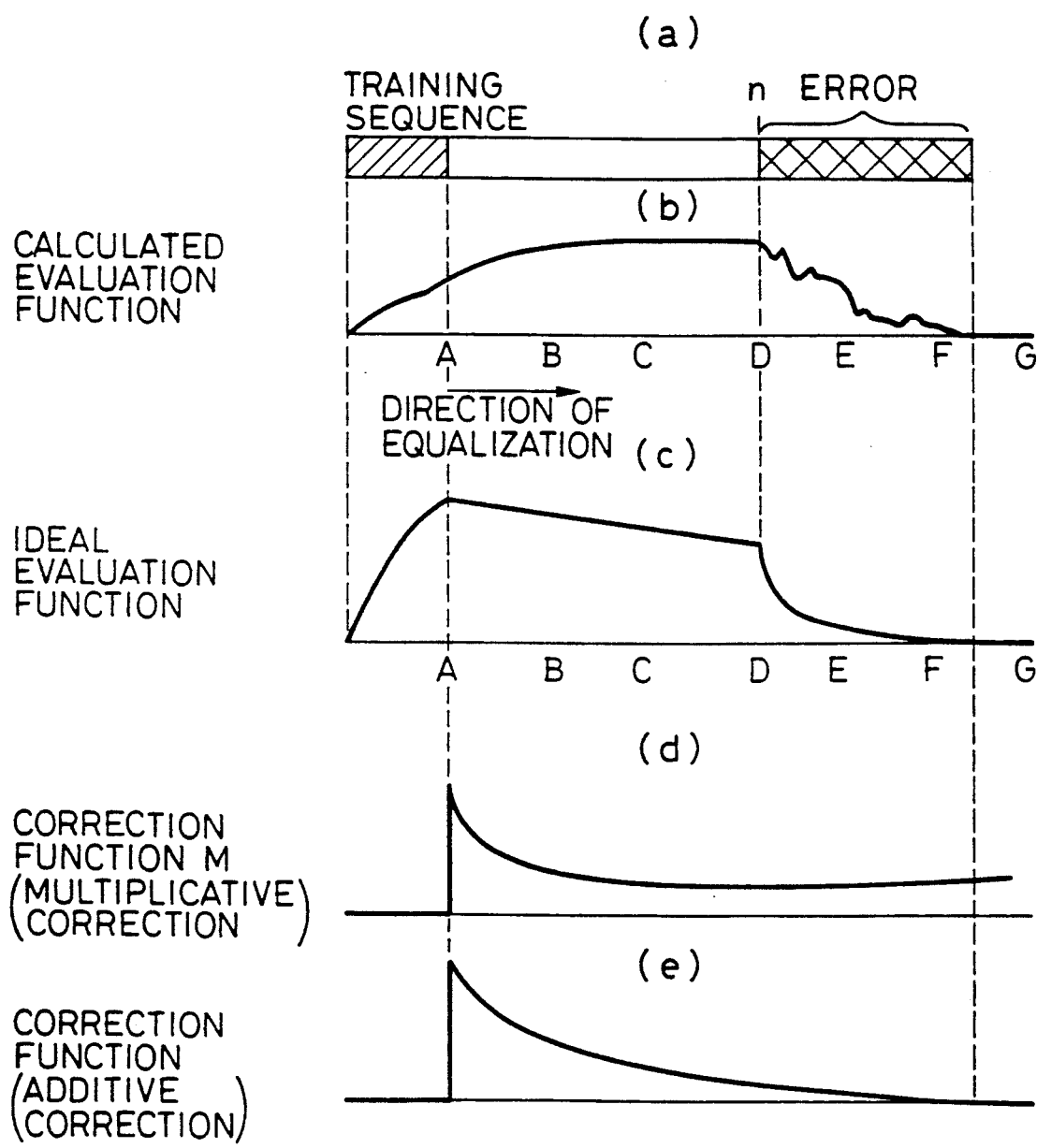
FIG. 17 is diagrammatic illustrations of forms of the signal sequence to be equalized, the evaluation function calculated by the configuration of FIG. 15, the ideal form of the evaluation function, and multiplicative and additive correction functions used by the correction unit in the configuration of FIG. 16.

Referring now to FIG. 17, as a simplified example, the evaluation function calculated in a case of focusing only on a particular tap 90 and using the low pass filter 94 of FIG. 13, i.e., a case as shown in FIG. 15, will be described in detail.

Namely, in this example, the data has the bits up to the n-th bit to be correct but the bits after the n-th bit in error as shown in (a) of FIG. 17.

In such a case, the evaluation function calculated by the configuration of FIG. 15 appears as shown in (b) of FIG. 17, where the decline of the value after the point D corresponding to the n-th bit of the data indicate the unreliableness of the equalization output for the bits after the n-th bit.

In contrast, the ideal evaluation function should have the form shown in (c) of FIG. 17, where the reliability is indicated to be very high in a vicinity of the training sequence and gradually decreasing for the bit farther away from the training sequence, and rapidly declining for the bits in error. The exact shape of the ideal evaluation function is not necessarily limited to that shown in (c) of FIG. 17, but the qualitative description given above should be reflected accurately.

Now, by comparing (b) and (c) of FIG. 17, it can be seen that the curve in the portion between the points A and C is quite different in (b) and (c) of FIG. 17. Namely, in the actually calculated evaluation function, the value becomes low even in an immediate vicinity of the relevant training sequence because of the initial rise characteristic of the low pass filter 94, despite the fact that the reliability is actually known to be very high in the vicinity of the training sequence.

In order to correct this property of the calculated evaluation function, it is necessary to modify the configuration of FIG. 15 to that shown in FIG. 16, in which a correction device 96 is added after the absolute value calculator 95. This correction device 96 carries out the correction of the evaluation function by either multiplying it by a multiplicative correction function M shown in (d) of FIG. 17, or by adding to it an additive correction function A shown in (e) of FIG. 17, such that the deviation of the evaluation function in the vicinity of the relevant training sequence from the ideal one can be rectified by raising increasing the values of the calculated evaluation function in the vicinity of the relevant training sequence.

Figure 18:
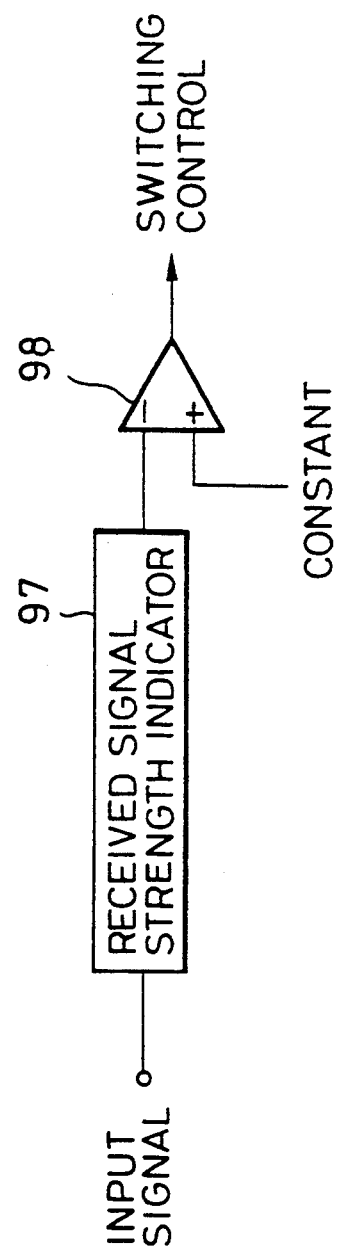
FIG. 18 is a block diagram of an alternative configuration of an evaluation function calculation unit for an equalization apparatus for carrying out one embodiment of a method of equalization according to the present invention.

As a modified embodiment of the embodiment described above, the evaluation function calculator 82 of FIG. 11 may be replaced by the configuration shown in FIG. 18.

This configuration of FIG. 18 comprises a received signal strength indicator (RSSI) 97 for receiving the input signals and detecting the signal strength of the input signals, and a comparator 98 for comparing the signal strength of the input signals detected by the received signal strength indicator 97 with a predetermined constant value, whose output is utilized in carrying out the switching control of the forward and backward equalization outputs.

Figure 19:
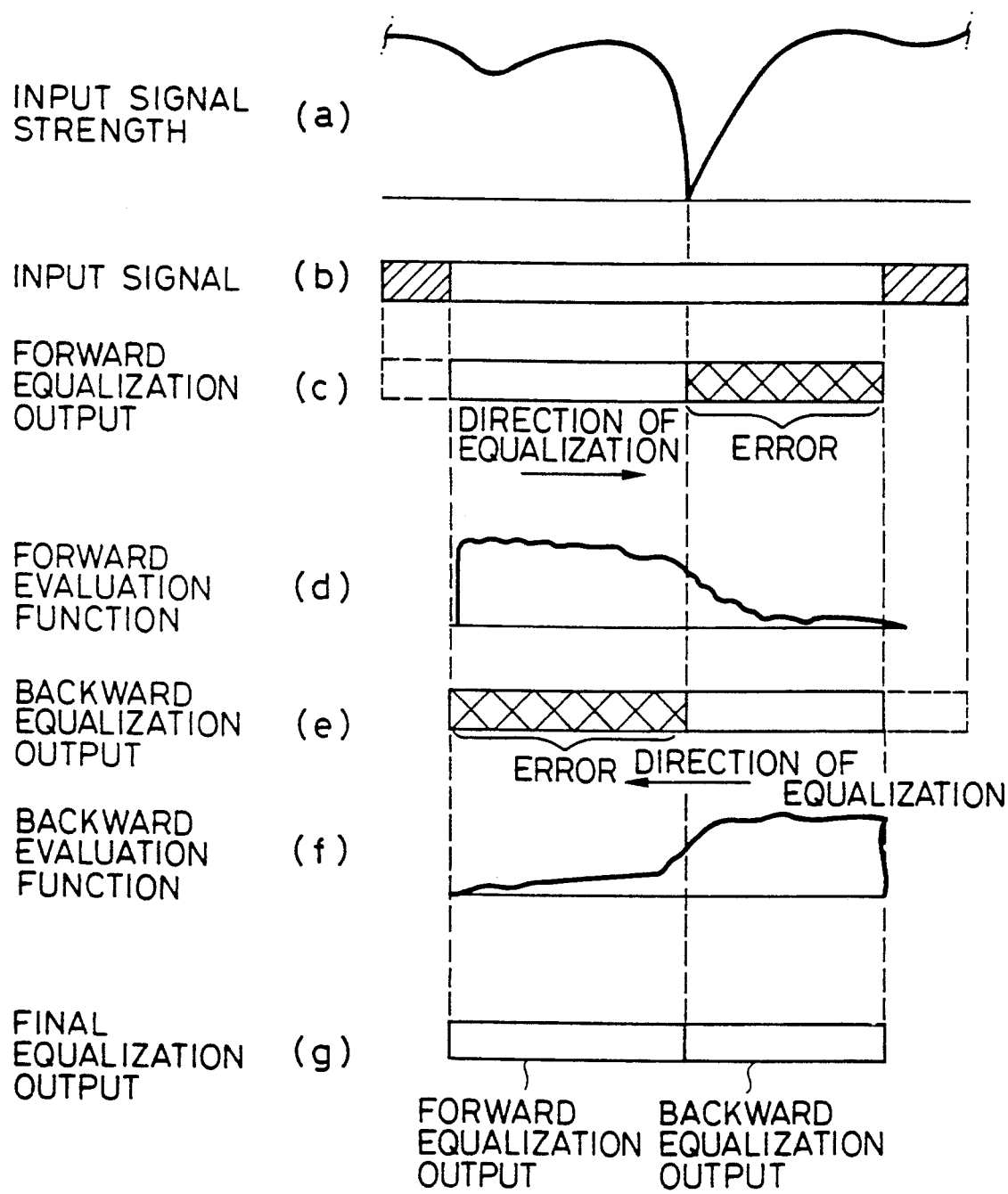
FIG. 19 is diagrammatic illustrations of forms of a signal strength of the received signal sequence, the signal sequence to be equalized, the forward equalization output, the forward evaluation function, the backward equalization output, the backward evaluation function, and the final equalization output, for a case of using the configuration of FIG. 18.

In this configuration of FIG. 18, the received signal strength indicator 97 detects the signal strength of the input signals as shown in (a) of FIG. 19. When there is a sudden drop of the signal strength as depicted in (a) of FIG. 19 in a middle of the data section shown in (b) of FIG. 19, it is known that the bursty error is likely to occur from then on. For this reason, the comparator 98 compares the signal strength of the input signals detected by the received signal strength indicator 97 with the constant value which is predetermined to be sufficiently small, so as to detect the occurrence of the sudden drop of the signal strength.

Here, it is assumed that the forward equalization output is as shown in (c) of FIG. 19 in which the portion before the sudden drop of the signal strength is correct and the portion after the sudden drop of the signal strength is in error, and the corresponding forward evaluation function is as shown in (d) of FIG. 19, while the backward equalization output is as shown in (e) of FIG. 19 in which the portion before the sudden drop of the signal strength is in error and the portion after the sudden drop of the signal strength is correct, and the corresponding backward evaluation function is as shown in (f) of FIG. 19.

Then, when the occurrence of the sudden drop is detected by the comparator 98, according to the output of the comparator 98, the equalization output to be used for the final equalization output is switched from the forward equalization output to the backward equalization output at the bit at which the sudden drop of the signal strength occurred, such that the final equalization output is formed from the forward equalization output in the portion before the sudden drop of the signal strength and the backward equalization output in the portion after the sudden drop of the signal strength, as shown in (f) of FIG. 19.

Figure 20:
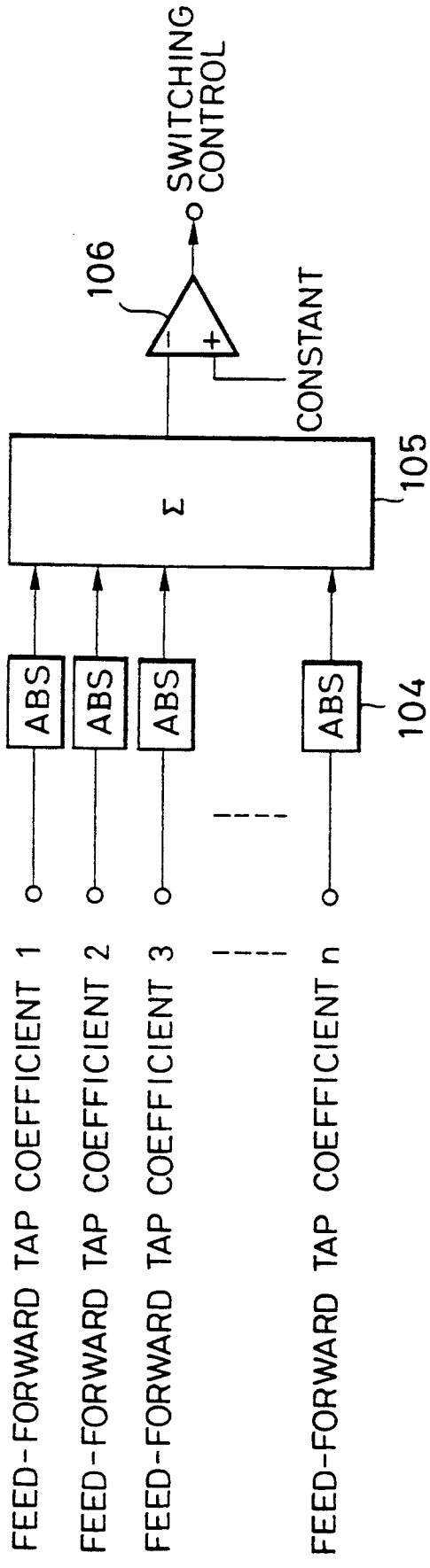
FIG. 20 is a block diagram of an alternative configuration of an evaluation function calculation unit for an equalization apparatus for carrying out one embodiment of a method of equalization according to the present invention.

Also, as a modified embodiment of the embodiment described above, the evaluation function calculator 82 of FIG. 11 may be replaced by the configuration shown in FIG. 20.

This configuration of FIG. 20 comprises a plurality of absolute value calculators 104, provided in correspondence to each feed-forward tap coefficient, for calculating the absolute values of the feed-forward tap coefficients; an adder 105 for calculating the sum of the absolute values of the feed-forward tap coefficients calculated by the absolute value calculators 104; and a comparator 106 for comparing the sum of the absolute values of the feed-forward tap coefficients calculated by the adder 105 with a predetermined constant value, whose output is utilized in carrying out the switching control of the forward and backward equalization outputs.

In general, it is known that when the sum of the absolute values of the feed-forward tap coefficients becomes smaller than a value sufficiently close to zero, the equalizer is in the limit cycle state. For this reason, in the configuration of FIG. 20, the comparator 106 compares the sum of the absolute values of the feed-forward tap coefficients calculated by the adder 105 with the constant value which is predetermined to be sufficiently small, so as to detect the start of the limit cycle state of the equalizer.

Then, when the start of the limit cycle state is detected by the comparator 106, according to the output of the comparator 106, the equalization output to be used for the final equalization output is switched from the forward equalization output to the backward equalization output, for instance, at the bit at which the limit cycle state started.

Moreover, the embodiment described above may be modified as shown in FIGS. 21 and 22, as follows.

Figure 21:
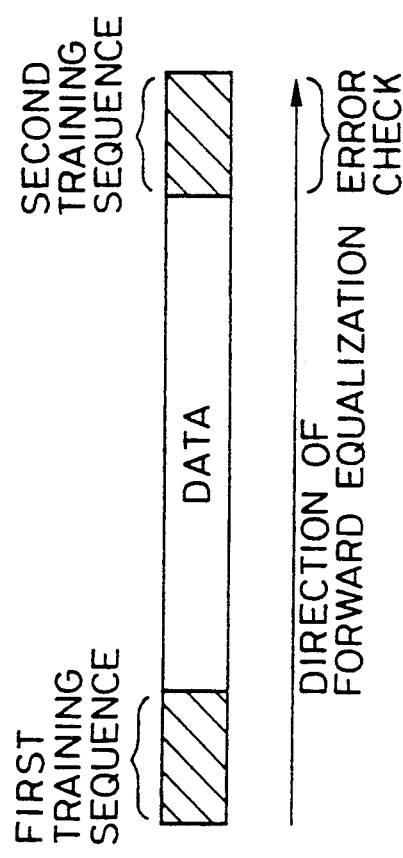
FIG. 21 is a diagrammatic illustration of a form of the signal sequence to be equalized for explaining an alternative embodiment of the method of equalization according to the present invention.
Figure 22:
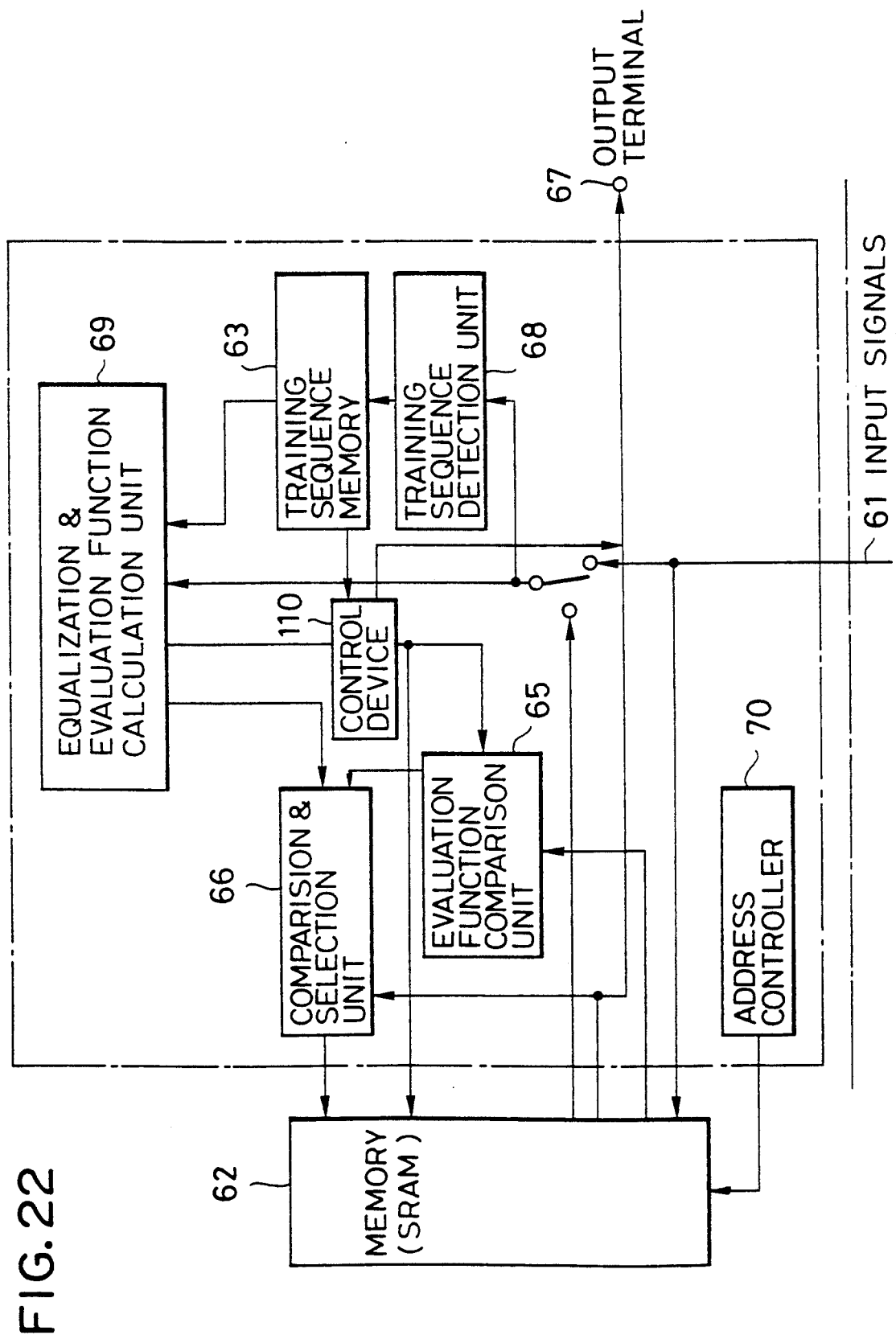
FIG. 22 is a block diagram of a configuration for an equalization apparatus for carrying out the alternative embodiment of a method of equalization according to the present invention explained by FIG. 21.

Namely, the configuration of FIG. 10 can be modified as shown in FIG. 22, in which whether it is necessary to carry out the backward equalization or not is judged from the presence or absence of an error in the forward equalization of the second training sequence before the actual execution of the backward equalization as shown in FIG. 21, so that the power consumption can be lowered as the unnecessary execution of the backward equalization can be avoided.

Here, the absence of the error in the forward equalization of the second training sequence can safely be considered as implying the absence of the error in the forward equalization of the data preceding the second training sequence, because it can be ascertained that the non-equalizable mode or limit cycle mode did not occur during the forward equalization of the data.

To achieve this modification, the configuration of FIG. 10 can be modified as shown in FIG. 22, where a control device 110 for receiving the forward equalization output from the equalization and the evaluation function calculation unit 69 before the forward equalization output is stored in the memory 62 and judging the presence or the absence of the error in the second training sequence is provided. When the control device 110 judges that the error is absent in the second training sequence, the forward equalization output is outputted to the output terminal 67 without being stored in the memory 62, and the next input signal is processed immediately, while otherwise the operation similar to that of the configuration of FIG. 10 is carried out.

It is also preferable to change the position of the center tap in the forward and backward equalizations, where the center tap is a feed-forward tap of an equalizer in which the signal sequence corresponding to the first symbol of the training sequence is stored at a time the first symbol of the training sequence is entered into the equalizer. This is because the transmission path characteristics of the signals to be equalized frequently oscillate between the minimum phase state and the non-minimum phase state, and what appears to be the minimum phase mode in the forward equalization appears as the non-minimum phase mode in the backward equalization. For this reason, it is preferable to be able to change the position of the center tap according to the transmission path characteristics for each case.

Besides those already mentioned above, many modifications and variations of the above embodiment may be made without departing from the novel and advantageous features of the present invention. Accordingly, all such modifications and variations are intended to be included within the scope of the appended claims.

What is claimed is:

1. A method of equalization, comprising the steps of:
    obtaining a signal sequence from received signals by applying frequency transformation and sampling;
    carrying out a forward equalization of the signal sequence to obtain a forward equalization output in which the signal sequence is equalized in an order in which the received signals are received;
    calculating a forward evaluation function indicating a reliability of the forward equalization by using the signal sequence;
    carrying out a backward equalization of the signal sequence to obtain a backward equalization output in which the signal sequence is equalized in an order opposite to that in which the received signals are received;
    calculating a backward evaluation function indicating a reliability of the backward equalization by using the signal sequence; and
    obtaining a final equalization output by selecting for each bit of the signal sequence one of the forward equalization output and the backward equalization output for which the reliability indicated by a corresponding one of the forward evaluation function and the backward evaluation function is higher as the final equalization output for each bit, such that the final equalization output is given as a composition of those parts of the forward equalization output for which the reliability indicated by the forward evaluation function is higher than the reliability of the backward equalization output indicated by the backward evaluation function and those parts of the backward equalization output for which the reliability indicated by the backward evaluation function is higher than the reliability of the forward equalization output indicated by the forward evaluation function.

2. The method of claim 1, wherein the forward evaluation function and the backward evaluation function are correlation values of the signal sequence with respect to the forward equalization output and the backward equalization output, respectively.

3. The method of claim 2, wherein at the step of obtaining the final equalization output, the final equalization output is obtained by differentially demodulating the forward equalization output and the backward equalization, and wherein at the calculating steps the forward evaluation function and the backward evaluation function are calculated from the forward equalization output and the backward equalization output which are not differentially demodulated.

4. The method of claim 1, wherein the signal sequence comprises data to be equalized, and first and second training sequences which sandwich the data to be equalized, and wherein the forward equalization is carried out for the first training sequence and the data to be equalized from a top of the first training sequence to an end of the data to be equalized, while the backward equalization is carried out for the second training sequence and the data to be equalized from an end of the second training sequence to a top of the data to be equalized.

5. The method of claim 4, wherein the first and second training sequences are unique words assigned to different users, and at the steps of carrying out the forward and backward equalizations the first and second training sequences are identified from a number of predetermined training sequences.

6. The method of claim 1, wherein the forward evaluation function and the backward evaluation function are obtained as an absolute value of a low pass filtered linear sum of sequentially delayed signal sequences multiplied by a conjugate of the forward equalization output and the backward equalization output, respectively.

7. The method of claim 6, wherein the low pass filtered linear sum is obtained by integrating sequentially delayed linear sums with each sequentially delayed linear sum multiplied by a window function.

8. The method of claim 7, wherein the signal sequence comprises data to be equalized, and first and second training sequences which sandwich the data to be equalized, and wherein the forward equalization is carried out for the first training sequence and the data to be equalized from a top of the first training sequence to an end of the data to be equalized, while the backward equalization is carried out for the second training sequence and the data to be equalized from an end of the second training sequence to a top of the data to be equalized, and wherein the window function for the forward evaluation function is in a form of an exponential function which is decreasing toward the first training sequence, while the window function for the backward evaluation function is in a form of an exponential function which is decreasing toward the second training sequence.

9. The method of claim 6, wherein the forward evaluation function is further adjusted by using a multiplicative correction function for increasing values of the data to be equalized in a vicinity of a first training sequence, while the backward evaluation function is further adjusted by using a multiplicative correction function for increasing values of the data to be equalized in a vicinity of a second training sequence.

10. The method of claim 6, wherein the forward evaluation function is further adjusted by using an additive correction function for increasing values of the data to be equalized in a vicinity of a first training sequence, while the backward evaluation function is further adjusted by using an additive correction function for increasing values of the data to be evaluated in a vicinity of a second training sequence.

11. The method of claim 1, wherein the forward equalization and the backward equalization are carried out by using a decision feedback equalizer.

12. The method of claim 1, further comprising the step of temporarily storing the signal sequence, the forward equalization output, and the forward evaluation function in memory means, and wherein at the step of carrying out the backward equalization, the backward equalization is carried out by using the temporarily stored signal sequence at equalizer means used for carrying out the forward equalization, while at the step of calculating the backward evaluation function, the backward evaluation function is calculated by using the temporarily stored signal sequence at calculation means used for calculating the forward evaluation function, and at the step of obtaining the final equalization output, the temporarily stored forward evaluation function is compared with the backward evaluation function obtained by the calculation means, in response to a result of which the selecting is carried out from the temporarily stored forward equalization output and the backward equalization output obtained by the equalizer means.

13. A method of equalization, comprising the steps of:
obtaining a signal sequence from received signals by applying frequency transformation and sampling;
carrying out a forward equalization of the signal sequence to obtain a forward equalization output in which the signal sequence is equalized in an order in which the received signals are received;
carrying out a backward equalization of the signal sequence to obtain a backward equalization output in which the signal sequence is equalized in an order opposite to that in which the received signals are received;
detecting an abnormal state in one of the forward equalization and the backward equalization; and
obtaining a final equalization output by making a selection of one of the forward equalization output and the backward equalization output as the final equalization output until the abnormal state of said one of the forward equalization and the backward equalization is detected, and switching the selection for the final equalization output to another one of the forward equalization output and the backward equalization output after the abnormal state of said one of the forward equalization and the backward equalization is detected.

14. The method of claim 13, wherein the abnormal state to be detected at the detecting step is a lowering of a signal strength of the signal sequence below a predetermined level.

15. The method of claim 13, wherein the abnormal state to be detected at the detecting step is a start of a limit cycle state in an equalizer for obtaining said one of the forward equalization and the backward equalization in which a sum of absolute values of feed-forward tap coefficients of the equalizer becomes lower than a predetermined number.

16. A method of equalization, comprising the steps of:
obtaining a signal sequence from received signals by applying frequency transformation and sampling, where the signal sequence comprises data to be equalized, and first and second training sequences which sandwich the data to be equalized;
carrying out a forward equalization of the signal sequence to obtain a forward equalization output in which the signal sequence is equalized in an order in which the received signals are received, from a top of the first training sequence to an end of the second training sequence;
detecting a presence of errors in the forward equalization output for the second training sequence;
in a case the presence of the errors in the forward equalization output for the second training sequence is not detected, obtaining a final equalization output as the forward equalization output for the data to be equalized; and
in a case the presence of the errors in the forward equalization output for the second training sequence is detected, calculating a forward evaluation function indicating a reliability of the forward equalization by using the signal sequence;

carrying out a backward equalization of the signal sequence to obtain a backward equalization output in which the signal sequence is equalized in an order opposite to that in which the received signals are received, from an end of the second training sequence to a top of the data to be equalized;

calculating a backward evaluation function indicating a reliability of the backward equalization by using the signal sequence; and obtaining a final equalization output by selecting for each bit of the data to be equalized of the signal sequence one of the forward equalization output for the data to be equalized and the backward equalization output for the data to be equalized for which the reliability indicated by a corresponding one of the forward evaluation function and the backward evaluation function is higher as the final equalization output for each bit, such that the final equalization output is given as a composition of those parts of the forward equalization output for the data to be equalized for which the reliability indicated by the forward evaluation function is higher than the reliability of the backward equalization output for the data to be equalized indicated by the backward evaluation function and those parts of the backward equalization output for the data to be equalized for which the reliability indicated by the backward evaluation function is higher than the reliability of the forward equalization output for the data to be equalized indicated by the forward evaluation function.

* * * * *